(12) United States Patent
Golitschek Edler von Elbwart et al.

(10) Patent No.: US 9,769,818 B2
(45) Date of Patent: Sep. 19, 2017

(54) COMMON EPDCCH SEARCH SPACE

(71) Applicant: Panasonic Intellectual Property Corporation of America, Torrance, CA (US)

(72) Inventors: Alexander Golitschek Edler von Elbwart, Darmstadt (DE); Hidetoshi Suzuki, Kanagawa (JP); Ayako Horiuchi, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/904,681

(22) PCT Filed: Aug. 9, 2013

(86) PCT No.: PCT/CN2013/081224
§ 371 (c)(1),
(2) Date: Jan. 12, 2016

(87) PCT Pub. No.: WO2015/018087
PCT Pub. Date: Feb. 12, 2015

(65) Prior Publication Data
US 2016/0150508 A1    May 26, 2016

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| 2011/0171985 A1* | 7/2011 | Papasakellariou .... H04W 72/02 455/509 |
| 2013/0003639 A1 | 1/2013 | Noh et al. |
| 2013/0094383 A1 | 4/2013 | Lin |
| 2013/0194931 A1 | 8/2013 | Lee et al. |

(Continued)

FOREIGN PATENT DOCUMENTS

| CN | 102883453 A | 1/2013 |
| WO | 2013/085353 A1 | 6/2013 |
| WO | 2013/113145 A1 | 8/2013 |

OTHER PUBLICATIONS

Extended European Search Report, dated Dec. 13, 2016, for corresponding EP Application No. 13891301.7-1851 / 3031274, 8 pages.

(Continued)

*Primary Examiner* — Huy D Vu
*Assistant Examiner* — James P Duffy
(74) *Attorney, Agent, or Firm* — Seed IP Law Group LLP

(57) ABSTRACT

The present invention relates to a method for configuring a common search space in an Enhanced Physical Downlink Control Channel for at least a first User Equipment and a second User Equipment, by means of a configurable Radio Network Temporary Identifier. The invention further relates to the corresponding transmitter and received implementing the method.

20 Claims, 7 Drawing Sheets

(56) References Cited

U.S. PATENT DOCUMENTS

| | | | | |
|---|---|---|---|---|
| 2014/0050192 A1* | 2/2014 | Kim | ................. | H04L 5/001 370/329 |
| 2014/0092815 A1* | 4/2014 | Ye | ................. | H04L 1/00 370/329 |
| 2014/0355451 A1* | 12/2014 | Kim | ................. | H04L 1/0026 370/241 |

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.

3GPP TS 36.211 V11.3.0, "3rd Generation Partnership Project; Technical Specification Group Radio Access Network; Evolved Universal Terrestrial Radio Access (E-UTRA); Physical Channels and Modulation (Release 11)," Jun. 2013, 108 pages.

3GPP TS 36.212 V11.3.0, "3rd Generation Partnership Project; Technical Specification Group Radio Access Network; Evolved Universal Terrestrial Radio Access (E-UTRA); Multiplexing and channel coding (Release 11)," Jun. 2013, 84 pages.

3GPP TS 36.321 V11.3.0, "3rd Generation Partnership Project; Technical Specification Group Radio Access Network; Evolved Universal Terrestrial Radio Access (E-UTRA); Medium Access Control (MAC) protocol specification (Release 11)," Jun. 2013, 57 pages.

3GPP TS 36.331 V11.4.0, "3rd Generation Partnership Project; Technical Specification Group Radio Access Network; Evolved Universal Terrestrial Radio Access (E-UTRA); Radio Resource Control (RCC); Protocol specification (Release 11)," Jun. 2013, 346 pages.

3GPP TR 36.828 V11.0.0, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)," Jun. 2012, 109 pages.

International Search Report dated Apr. 3, 2014, for corresponding International Application No. PCT/CN2013/081224, 2 pages.

Sesia et al., "LTE the UMTS Long Term Evolution—From Theory to Practice," Wiley, 2009, 21 pages.

MediaTek Inc., "Signaling Support for TDD eIMTA," R1-132273, 3GPP TSG-RAN WG1 Meeting #73, Agenda Item: 6.2.3.2, Fukuoka, Japan, May 20-24, 2013, 6 pages.

English Translation of Notice of Reasons for Rejection, dated Jun. 6, 2017, for corresponding Japanese Application No. 2016-532190, 19 pages.

Renesas Mobile Europe Ltd, "Further Discussion on Signaling Schemes for TDD eIMTA," R1-132168, 3GPP TSG RAN WG1 Meeting #73, Agenda Item: 6.2.3.2, Fukuoka, Japan, May 20-24, 2013, 6 pages.

* cited by examiner

| Uplink-downlink configuration | Downlink-to-Uplink Switch-point periodicity | Subframe number | | | | | | | | | | Number of | | |
|---|---|---|---|---|---|---|---|---|---|---|---|---|---|---|
| | | 0 | 1 | 2 | 3 | 4 | 5 | 6 | 7 | 8 | 9 | D | U | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

D    Downlink subframe

U    Uplink subframe

S    Special subframe

Fig. 5

COMMON EPDCCH SEARCH SPACE

FIELD OF THE INVENTION

The invention relates to methods for communication between a mobile station and a base station based on a new RNTI field, which allows the transmission, in a common search space, of messages directed to one mobile station only, or to a plurality of mobile stations. The invention is also providing the mobile station and the base station for participating in the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e. resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution— From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access.

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation.

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank.

Format 2B: Introduced in Release 9 and is used for the transmission of resource assignments for PDSCH for dual-layer beamforming.

Format 2C: Introduced in Release 10 and is used for the transmission of resource assignments for PDSCH for closed-loop single-user or multi-user MIMO operation with up to 8 layers.

Format 2D: introduced in Release 11 and is used for up to 8 layer transmissions; mainly used for COMP (Cooperative Multipoint)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB. The number of bits indicated in the right column include the bits for the CRC of the particular DCI.

TABLE

DCI Formats

| DCI format | Purpose | Number of bits including CRC |
| --- | --- | --- |
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

In order for the UE to identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

TABLE

RNTIs

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Physical Downlink Control Channel (PDCCH) and Physical Downlink Shared Channel (PDSCH)

The physical downlink control channel (PDCCH) carries e.g. scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant (i.e. resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

Enhanced-PDCCH

The Enhanced PDCCH (EPDCCH) is transmitted based on UE-specific reference signals. In order to efficiently use UE-specific reference signals, the mapping of Enhanced-PDCCH is allocated in the PDSCH region. In order not to blind-decode the whole bandwidth, the search space of EPDCCH would be limited within a set of PRB pairs. The set of PRB pairs can be first configured by higher layer signaling, or at least is assumed to be known by the receiver prior to trying to detect any EPDCCH.

The EPDCCH consists of an aggregation of one or more Enhanced Control Channel Elements (ECCEs). Furthermore, an ECCE is formed from resource element groups that are mapped to resource elements in the time/frequency grid, called Enhanced Resource Element Groups (EREGs).

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e. uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance that the transmission and reception occur on the same carrier frequency, i.e. downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 5 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 6 shows the frame structure type 2, particularly for a 5 ms switch-point periodicity, i.e. for TDD configurations 0, 1, 2 and 6.

FIG. 6 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 5.

As can be appreciated from FIG. 5, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot).

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UL/DL ACK/NACK feedback.
Shortcoming of Current Semi-Static TDD UL/DL Configuration Scheme Currently, LTE TDD allows for asymmetric UL-DL allocations by providing seven different semi-statically configured uplink-downlink configurations, denoted static TDD configurations in the following (see FIG. 5). The current mechanism for adapting UL-DL allocation is based on the system information acquisition procedure or the system information change procedure, where the particular static UL-DL TDD configuration is indicated by a SIB, particularly by the TDD-config parameter in SIB1 (for details on the broadcast of system information, 3GPP TS 36.331, v11.4.0, incorporated herein by reference).

With the Release 8 system information change procedure, the supported time scale for a TDD UL/DL re-configuration is every 640 ms or larger. When re-using the ETWS (Earthquake and Tsunami Warning System), the supported time scale for UL-DL TDD re-configuration is every 320 ms or larger depending on the configured default paging cycle.

The semi-static allocation of the TDD UL/DL configuration may or may not match the instantaneous traffic situation. The time scale to change the static TDD configuration is rather large. It would be advantageous to adapt more quickly the TDD UL/DL configuration to the current traffic needs; for instance, in order to dynamically create more downlink subframes to increase downlink bandwidth or in order to dynamically create more blank uplink subframes to mitigate interference to the communication e.g. in uplink or downlink of a neighbouring cell. Correspondingly, it is expected that Release 12 will adopt a more dynamic change of the TDD UL/DL configuration.

3GPP launched a study item TR 36.828 v11.0.0 to study the time scales of various types of TDD UL/DL re-configurations and their benefits and disadvantages. In general, the study item concluded that faster TDD UL/DL re-configuration time scales provide larger benefits than slower TDD UL/DL re-configuration time scales. Further, the amount of required specification changes varies depending on the supported re-configuration time scales.
Need for a Faster TDD UL/DL Configuration Scheme Recently the reconfiguration of the TDD value has been under close scrutiny. The tendency is to reconfigure the TDD more often than previously, so as to better adapt to changing channel and traffic conditions.

A rough value for the interval between TDD changes can be, for example, in the range from 10 ms to 640 ms. Moreover, the change of TDD must usually be notified to a plurality of UEs.

These two requirements make the notification of the changing TDD rather complex. While a message for each UE would result in each UE being constantly informed about the new TDD value, such an approach increases the amount of DCI information on the channel, with a direct reduction in terms of available data capacity. Conversely, the use of a broadcast message, which would not have such a large DCI overhead, is not suitable as its frequency is too small to keep up with the intended frequency change of the TDD.

One of the objects of the present invention is to allow a frequent transmission of the TDD reconfiguration value to a number of UEs. A more general objective of the present invention is to transmit any payload which needs to reach several UEs with such requirements that make a broadcasting message unsuitable.

This is achieved by the teaching of the independent claims.

In particular, an embodiment of the present invention can relate to a method for determining resources for control channel transmission, including the step of storing a configurable Radio Network Temporary Identifier in a first User Equipment as well as in a second User Equipment in the same cell of the first User Equipment, wherein the configurable Radio Network Temporary Identifier has the same value for the first User Equipment and for the second User Equipment and wherein the configurable Radio Network Temporary Identifier is configured to define a common search space in an Enhanced Physical Downlink Control Channel for the first User Equipment and for the second User Equipment.

In some embodiments, the value of the configurable Radio Network Temporary Identifier is a fixed value, in particular 0, or it is computed based on any value associated with the cell detection procedure, in particular the Physical Cell ID, and/or based on a value conveyed by a Master Information Block, and/or based on the value of a Physical Broadcast Channel, and/or based on the value of a Radio Resource Control information element.

In some embodiments, the value of the configurable Radio Network Temporary Identifier is equal to the Physical Cell ID plus 1.

Some embodiments are further comprising the step of transmitting data to the first and/or second User Equipment based on the value of the configurable Radio Network Temporary Identifier.

In some embodiments, the step of transmitting data comprises the step of mapping the data to one or more Enhanced Control Channel Element defined based on the value of the configurable Radio Network Temporary Identifier.

In some embodiments, the step of transmitting data comprises the step of adding a Cyclic Redundancy Check code to the data, and wherein the Cyclic Redundancy Check code is masked by using the configurable Radio Network Temporary Identifier, in particular by a binary XOR operation of the Cyclic Redundancy Check code with the configurable Radio Network Temporary Identifier.

In some embodiments, the step of transmitting data comprises the step of adding a Cyclic Redundancy Check code to the data, and wherein the Cyclic Redundancy Check code is masked by using a Cell Radio Network Temporary Identifier, in particular by a binary XOR operation of the Cyclic Redundancy Check code with a Cell Radio Network Temporary Identifier.

In some embodiments, the configurable Radio Network Temporary Identifier is used for the mapping of high aggregation levels, in particular for the two highest available aggregation levels, and wherein the configurable Radio Network Temporary Identifier is not used for the mapping of at least one of the remaining aggregation levels.

In some embodiments, two distributed Enhanced Physical Downlink Control Channel-Physical Resource Block sets are used and the first set of the two Enhanced Physical Downlink Control Channel-Physical Resource Block sets offers more high aggregation level candidates than the second set of the two distributed Enhanced Physical Downlink Control Channel-Physical Resource Block sets, and wherein the configurable Radio Network Temporary Identifier is used for the mapping of only the first set of the two distributed Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the configurable Radio Network Temporary Identifier is used for the mapping of only the distributed Enhanced Physical Downlink Control Channel-Physical Resource Block set.

In some embodiments, the configurable Radio Network Temporary Identifier is used for the mapping of low aggregation levels, in particular for the two lowest available aggregation levels and wherein the configurable Radio Network Temporary Identifier is not used for the mapping of at least one of the remaining aggregation levels.

In some embodiments, two distributed Enhanced Physical Downlink Control Channel-Physical Resource Block sets are used and the second set of the two Enhanced Physical Downlink Control Channel-Physical Resource Block sets offers more low aggregation level candidates than the first set of the two distributed Enhanced Physical Downlink Control Channel-Physical Resource Block sets, and wherein the configurable Radio Network Temporary Identifier is used for the mapping of only the second set of the distributed two Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the configurable Radio Network Temporary Identifier is used for the mapping of only the localized Enhanced Physical Downlink Control Channel-Physical Resource Block set.

In some embodiments, the data defines a Time Division Duplex uplink/downlink configuration value for the communication between a transmitter and the first User Equipment and/or the second User Equipment.

In some embodiments, the data is transmitted in fixed downlink subframes only, in particular in subframe 0 and in subframe 5, of a radio frame.

In some embodiments, a Cell Radio Network Temporary Identifier is used for mapping the data to one or more Enhanced Control Channel Element in the remaining subframes of a radio frame.

In some embodiments, three Enhanced Physical Downlink Control Channel-Physical Resource Block sets are available and the configurable Radio Network Temporary Identifier is used for the mapping of only one of the three Enhanced Physical Downlink Control Channel-Physical Resource Block sets.

Further, an embodiment of the present invention can relate to a transmitter configured to use a configurable Radio Network Temporary Identifier for determining resources for control channel transmission in order to define a common search space in an Enhanced Physical Downlink Control Channel for a first User Equipment and for a second User Equipment in the same cell of the first User Equipment.

In some embodiments, the value of the configurable Radio Network Temporary Identifier is a fixed value, in particular 0, or it is computed based on any value associated with the cell detection procedure, in particular the Physical Cell ID, and/or based on the value of a Master Information Block, and/or based on the value of a Physical Broadcast Channel, and/or based on the value of a Radio Resource Control.

In some embodiments, the value of the configurable Radio Network Temporary Identifier is equal to the Physical Cell ID plus 1.

Some embodiments are further configured to transmit data to the first and/or second User Equipment based on the value of the configurable Radio Network Temporary Identifier.

In some embodiments, for the transmission of the data the transmitter is further configured to map the data to one or more Enhanced Control Channel Element defined based on the value of the configurable Radio Network Temporary Identifier.

In some embodiments, for the transmission of the data the transmitter is further configured to add a Cyclic Redundancy Check code to the data, and wherein the Cyclic Redundancy Check code is masked by using the configurable Radio Network Temporary Identifier, in particular by a binary XOR operation of the Cyclic Redundancy Check code with the configurable Radio Network Temporary Identifier.

In some embodiments, for the transmission of the data the transmitter is further configured to add a Cyclic Redundancy Check code to the transmitted data, and wherein the Cyclic Redundancy Check code is masked by using a Cell Radio Network Temporary Identifier, in particular by a binary XOR operation of the Cyclic Redundancy Check code with a Cell Radio Network Temporary Identifier.

In some embodiments, the transmitter is configured to use the configurable Radio Network Temporary Identifier for the mapping of high aggregation levels, in particular for the two highest available aggregation levels, and wherein transmitter is configured not to use the configurable Radio Network Temporary Identifier for the mapping of at least one of the remaining aggregation levels.

In some embodiments, the transmitter is configured to use two distributed Enhanced Physical Downlink Control Channel-Physical Resource Block sets and the first set of the two Enhanced Physical Downlink Control Channel-Physical Resource Block sets offers more high aggregation level candidates than the second set of the two distributed Enhanced Physical Downlink Control Channel-Physical Resource Block sets, and wherein the transmitter is configured to use the configurable Radio Network Temporary Identifier for the mapping of only the first set of the two distributed Enhanced Physical Downlink Control Channel-Physical Resource Block sets.

In some embodiments, the transmitter is configured to use one distributed Enhanced Physical Downlink Control Channel-Physical Resource Block set and one localized Enhanced Physical Downlink Control Channel-Physical Resource Block set, and wherein the transmitter is configured to use the configurable Radio Network Temporary Identifier for the mapping of only the distributed Enhanced Physical Downlink Control Channel-Physical Resource Block set.

In some embodiments, the transmitter is configured to use the configurable Radio Network Temporary Identifier for the mapping of low aggregation levels, in particular for the two lowest available aggregation levels and wherein the transmitter is configured not to use the configurable Radio Network Temporary Identifier for the mapping of at least one of the remaining aggregation levels.

In some embodiments, the transmitter is configured to use two distributed Enhanced Physical Downlink Control Channel-Physical Resource Block sets and the second set of the two Enhanced Physical Downlink Control Channel-Physical Resource Block sets offers more low aggregation level candidates than the first set of the two distributed Enhanced Physical Downlink Control Channel-Physical Resource Block sets, and wherein the transmitter is configured to use the configurable Radio Network Temporary Identifier for the mapping of only the second set of the distributed two Enhanced Physical Downlink Control Channel-Physical Resource Block sets.

In some embodiments, the transmitter is configured to use one distributed Enhanced Physical Downlink Control Channel-Physical Resource Block set and one localized Enhanced Physical Downlink Control Channel-Physical Resource Block set, and wherein the transmitter is configured to use the configurable Radio Network Temporary Identifier for the mapping of only the localized Enhanced Physical Downlink Control Channel-Physical Resource Block set.

In some embodiments, the data defines a Time Division Duplex value for the communication between the transmitter and the first User Equipment and/or the second User Equipment.

In some embodiments, the transmitter is configured to transmit data in fixed download subframes only, in particular in subframe 0 and in subframe 5.

In some embodiments, the transmitter is configured to use a Cell Radio Network Temporary Identifier to transmit data in the remaining subframes.

In some embodiments, the transmitter is configured to use three Enhanced Physical Downlink Control Channel-Physical Resource Block sets and wherein the transmitter is configured to use the configurable Radio Network Temporary Identifier for the mapping of only one of the three Enhanced Physical Downlink Control Channel-Physical Resource Block sets.

Further, an embodiment of the present invention can further relate to a method for determining resources for control channel reception including the step of storing a configurable Radio Network Temporary Identifier in a first User Equipment, wherein the configurable Radio Network Temporary Identifier is used by the User Equipment to define a search space common to the first User Equipment and to a second User Equipment, in the same cell of the first User Equipment, in an Enhanced Physical Downlink Control Channel.

In some embodiments, wherein the value of the configurable Radio Network Temporary Identifier is a fixed value, in particular 0, or it is computed based on any value associated with the cell detection procedure, in particular the Physical Cell ID, and/or based on the value of a Master Information Block, and/or based on the value of a Physical Broadcast Channel, and/or based on the value of a Radio Resource Control.

In some embodiments, wherein the value of the configurable Radio Network Temporary Identifier is equal to the Physical Cell ID plus 1.

Some embodiments are further comprising the step of receiving data based on the value of the configurable Radio Network Temporary Identifier.

In some embodiments, the step of receiving data comprises the step of blind decoding data from one or more Enhanced Control Channel Element defined based on the value of the configurable Radio Network Temporary Identifier.

In some embodiments, the step of receiving data comprises the step of checking a Cyclic Redundancy Check code by using the configurable Radio Network Temporary Identifier, in particular by a binary XOR operation of the Cyclic Redundancy Check code with the configurable Radio Network Temporary Identifier.

In some embodiments, the step of receiving data comprises the step of checking a Cyclic Redundancy Check code by using a Cell Radio Network Temporary Identifier, in particular by a binary XOR operation of the Cyclic Redundancy Check code with a Cell Radio Network Temporary Identifier.

In some embodiments, the configurable Radio Network Temporary Identifier is used for the search space definition of high aggregation levels, in particular for the two highest available aggregation levels, and wherein the configurable Radio Network Temporary Identifier is not used for the search space definition of at least one of the remaining aggregation levels.

In some embodiments, two distributed Enhanced Physical Downlink Control Channel-Physical Resource Block sets are used and the first set of the two Enhanced Physical Downlink Control Channel-Physical Resource Block sets offers more high aggregation level candidates than the second set of the two distributed Enhanced Physical Downlink Control Channel-Physical Resource Block sets, and wherein the configurable Radio Network Temporary Identifier is used for the search space definition of only the first set of the two distributed Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the configurable Radio Network Temporary Identifier is used for the search space definition of only the distributed Enhanced Physical Downlink Control Channel-Physical Resource Block set.

In some embodiments, the configurable Radio Network Temporary Identifier is used for the search space definition of low aggregation levels, in particular for the two lowest available aggregation levels, and wherein the configurable Radio Network Temporary Identifier is not used for the search space definition of at least one of the remaining aggregation levels.

In some embodiments, two distributed Enhanced Physical Downlink Control Channel-Physical Resource Block sets are used and the second set of the two Enhanced Physical Downlink Control Channel-Physical Resource Block sets offers more low aggregation level candidates than the first set of the two distributed Enhanced Physical Downlink Control Channel-Physical Resource Block sets, and wherein the configurable Radio Network Temporary Identifier is used for the search space definition of only the second set of the distributed two Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the configurable Radio Network Temporary Identifier is used for the search space definition of only the localized Enhanced Physical Downlink Control Channel-Physical Resource Block set.

In some embodiments, the data defines a Time Division Duplex value for the communication between a transmitter and the first User Equipment.

In some embodiments, the data is received in fixed download subframes only, in particular in subframe 0 and in subframe 5.

In some embodiments, a Cell Radio Network Temporary Identifier is used for the reception of data in the remaining subframes.

In some embodiments, three Enhanced Physical Downlink Control Channel-Physical Resource Block sets are available and the configurable Radio Network Temporary Identifier is used for the search space definition of only one of the three Enhanced Physical Downlink Control Channel-Physical Resource Block sets.

Further, an embodiment of the invention can relate to a User Equipment configured to store a configurable Radio Network Temporary Identifier, wherein the configurable Radio Network Temporary Identifier is used by the User Equipment to define a search space common to the User Equipment and to a second User Equipment, in the same cell of the User Equipment, in an Enhanced Physical Downlink Control Channel.

In some embodiments, the value of the configurable Radio Network Temporary Identifier is a fixed value, in particular 0, or it is computed based on any value associated with the cell detection procedure, in particular the Physical Cell ID, and/or based on the value of a Master Information Block, and/or based on the value of a Physical Broadcast Channel, and/or based on the value of a Radio Resource Control.

In some embodiments, the value of the configurable Radio Network Temporary Identifier is equal to the Physical Cell ID plus 1.

In some embodiments, the User Equipment is further configured to receive data based on the value of the configurable Radio Network Temporary Identifier.

In some embodiments, the User Equipment is configured to blind decode data from one or more Enhanced Control Channel Element defined based on the value of the configurable Radio Network Temporary Identifier.

In some embodiments, the User Equipment is configured to check a Cyclic Redundancy Check code by using the configurable Radio Network Temporary Identifier, in particular by a binary XOR operation of the Cyclic Redundancy Check code with the configurable Radio Network Temporary Identifier.

In some embodiments, the User Equipment is configured to check a Cyclic Redundancy Check code by using a Cell Radio Network Temporary Identifier, in particular by a binary XOR operation of the Cyclic Redundancy Check code with a Cell Radio Network Temporary Identifier.

In some embodiments, the User Equipment is configured to use the configurable Radio Network Temporary Identifier for the search space definition of high aggregation levels, in particular for the two highest available aggregation levels and wherein the User Equipment is configured not to use the configurable Radio Network Temporary Identifier for the search space definition of at least one of the remaining aggregation levels.

In some embodiments, two distributed Enhanced Physical Downlink Control Channel-Physical Resource Block sets are used and the first set of the two Enhanced Physical Downlink Control Channel-Physical Resource Block sets offers more high aggregation level candidates than the second set of the two distributed Enhanced Physical Downlink Control Channel-Physical Resource Block sets, and wherein the User Equipment is configured to use the configurable Radio Network Temporary Identifier for the search space definition of only the first set of the two distributed Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the User Equipment is configured to use the configurable Radio Network Temporary Identifier for the search space definition of only the distributed Enhanced Physical Downlink Control Channel-Physical Resource Block set.

In some embodiments, the User Equipment is configured to use the configurable Radio Network Temporary Identifier only for the search space definition of low aggregation levels, in particular for the two lowest available aggregation levels, and wherein the User Equipment is configured not to use the configurable Radio Network Temporary Identifier for the search space definition of at least one of the remaining aggregation levels.

In some embodiments, two distributed Enhanced Physical Downlink Control Channel-Physical Resource Block sets are used and the second set of the two Enhanced Physical Downlink Control Channel-Physical Resource Block sets offers more low aggregation level candidates than the first set of the two distributed Enhanced Physical Downlink Control Channel-Physical Resource Block sets, and wherein the User Equipment is configured to use the configurable Radio Network Temporary Identifier for the search space definition of only the second set of the distributed two Enhanced Physical Downlink Control Channel-Physical Resource Block sets.

In some embodiments, one distributed Enhanced Physical Downlink Control Channel-Physical Resource Block set and one localized Enhanced Physical Downlink Control Channel-Physical Resource Block set are used, and wherein the User Equipment is configured to use the configurable Radio Network Temporary Identifier for the search space definition of only the localized Enhanced Physical Downlink Control Channel-Physical Resource Block set.

In some embodiments, the data defines a Time Division Duplex value for the communication between a transmitter and the User Equipment.

In some embodiments, the User Equipment is configured to receive the data in fixed download subframes only, in particular in subframe 0 and in subframe 5.

In some embodiments, the User Equipment is configured to use a Cell Radio Network Temporary Identifier for the reception of data in the remaining subframes.

In some embodiments, three Enhanced Physical Downlink Control Channel-Physical Resource Block sets are available and the User Equipment is configured to use the configurable Radio Network Temporary Identifier for the search space definition of only one of the three Enhanced Physical Downlink Control Channel-Physical Resource Block sets.

BRIEF DESCRIPTION OF THE DRAWINGS

The invention will be better understood with reference to the accompanying drawings. The corresponding embodiments are only possible configuration in which the individual features may, however, as described above, be implemented independently of each other or may be omitted. Equal elements illustrated in the drawings are provided with equal reference signs. Parts of the description relating to equal elements illustrated in the drawings may be left out.

In the drawings.

DETAILED DESCRIPTION OF THE EMBODIMENTS

Figure 1:
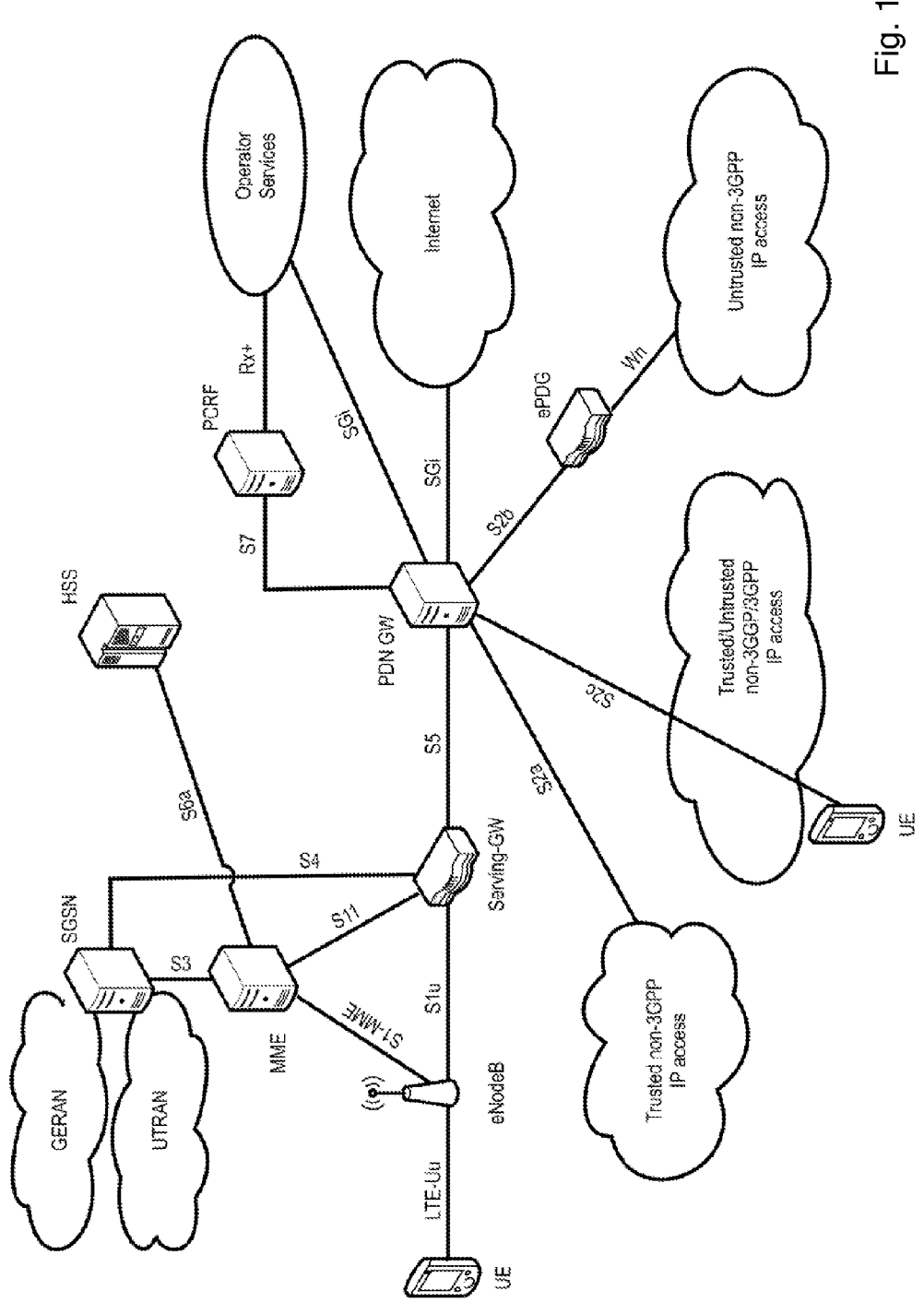
FIG. 1 schematically illustrates an exemplary architecture of a 3GPP LTE system, FIG. 2 schematically illustrates an exemplary overview of the overall E-UTRAN architecture of 3GPP LTE, FIG. 3 schematically illustrates exemplary subframe boundaries on a downlink component carrier as defined for 3GPP LTE (as of Release 8/9), FIG. 4 schematically illustrates an exemplary downlink resource grid of a downlink slot as defined for 3GPP LTE (as of Release 8/9), FIG. 5 schematically illustrates the seven currently-standardized (static) TDD UL/DL configurations 0-6, the respective definitions of the 10 subframes and their switch-point periodicity, FIG. 6 schematically illustrates the structure of a radio frame, being composed of two half-frames and 10 subframes, for a 5 ms switch-point periodicity, FIG. 7 schematically illustrates five different UEs in accordance with an aspect of the present invention.
Figure 2:
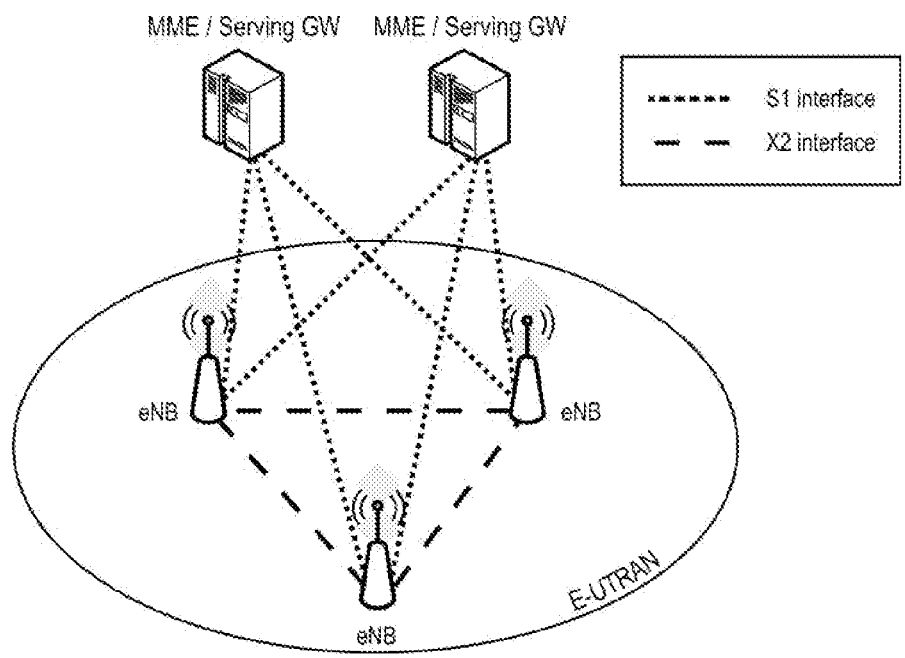
Figure 3:
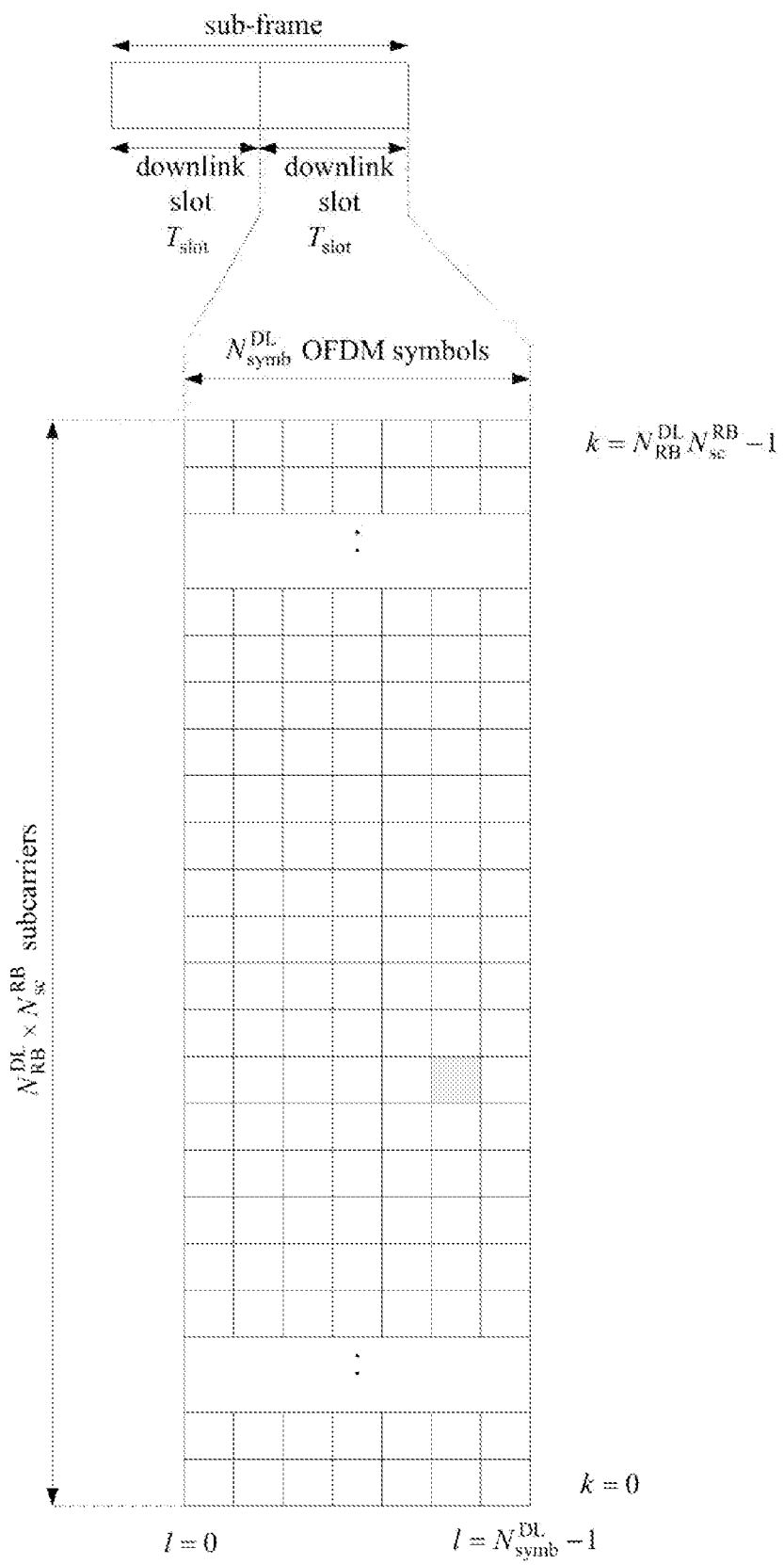
Figure 4:
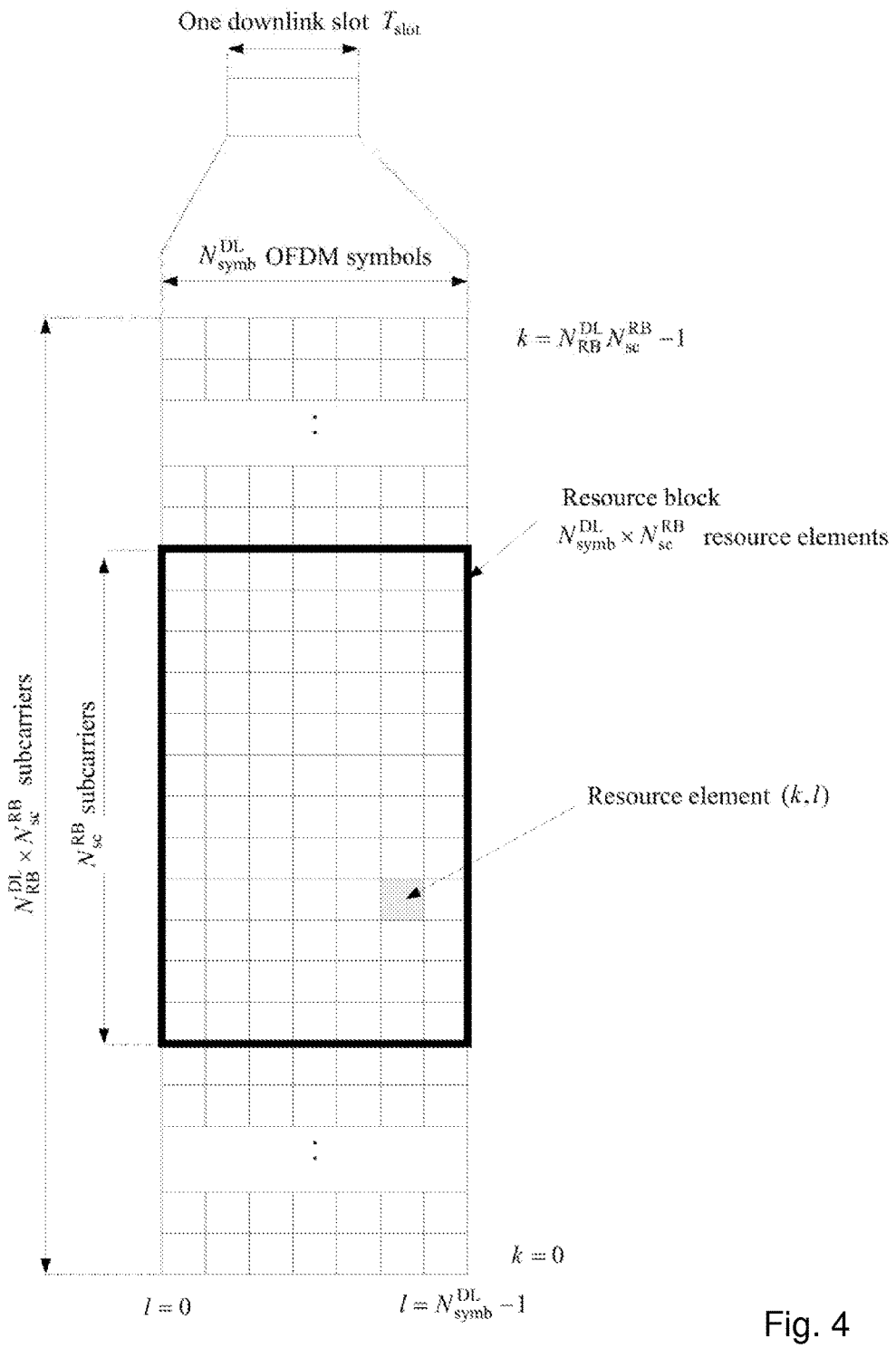
Figure 6:
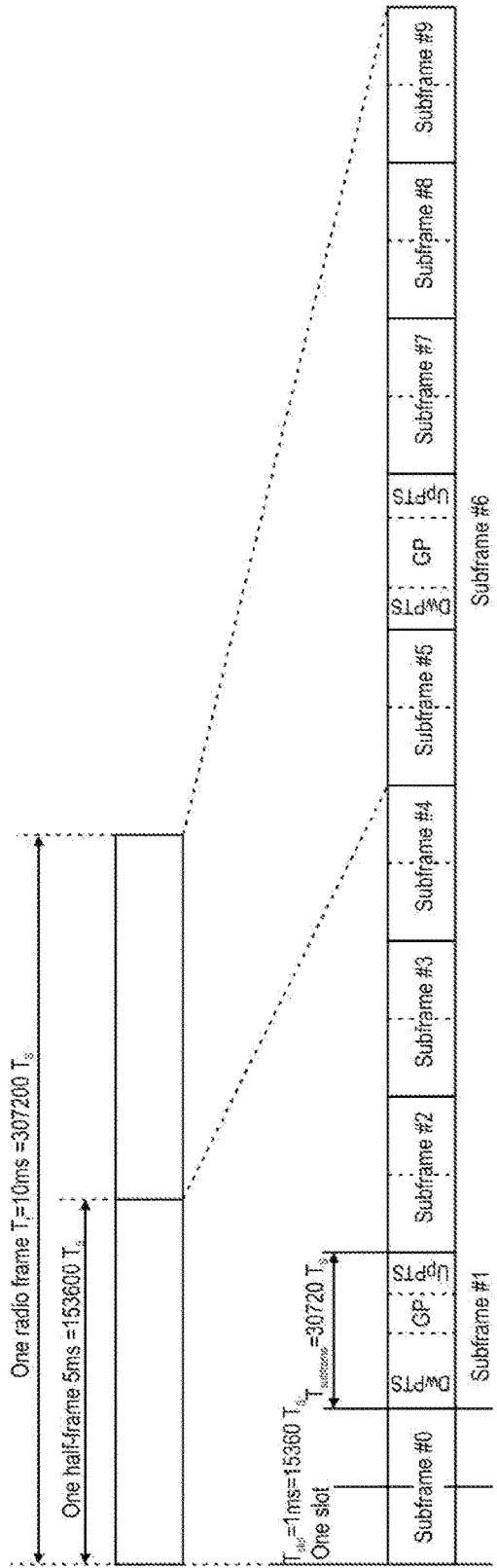

In LTE release 11, up to two Enhanced PDCCH (in the following, EPDCCH) PRB sets can be configured per UE in the EPDCCH search space. In particular, blind decoding for DCI via EPDCCH is performed individually for each EPDCCH-PRB set so that only Enhanced CCEs (in the following, ECCE) from the same PRB are aggregated. When the UE has to determine which ECCE(s) should be used for blind decoding, it uses the RNTI value corresponding to the indicated transmission. Currently, this is limited to the C-RNTI and to the SPS C-RNTI.

In other words, in order to identify which of the several ECCE(s) form an EPDCCH and carry the DCI for the specific UE, the given UE has to know which ECCE(s) it should monitor. Such a decision is made based on the value of the RNTI.

Moreover, the value of C-RNTI is used at the UE after the blind decoding in order to determine whether or not the decoded EPDCCH is intended for the specific UE. This is done by using the C-RNTI for a CRC check on the decoded EPDCCH. If the CRC check is not positive, the EPDCCH is determined not to be directed to the given UE. Thus, currently, each UE uses its C-RNTI twice. Once for defining the ECCE(s) indexes forming an EPDCCH for which blind decoding should be carried out, where usually a plurality of EPDCCH candidates exist, and once for running a CRC check on the decoded EPDCCH (s).

Therefore, the current use of the C-RNTI for receiving a common message at a plurality of UEs is not efficient, in that due to having a different C-RNTI for each UE, the common message cannot be sent only once for all UEs, but has to be sent once per each UE. Even when using the two EPDCCH-PRB sets, while different UEs can be configured to look at the same PRB pair for EPDCCH, due to the different C-RNTI of the different UEs they will attempt blind decoding of different EPDCCH (s).

This is more evident with reference to formula (1) below. In particular, formula (1) below describes how the ECCE index is computed at the UE in order to implement blind decoding of EPDCCH(s), $$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i \quad (1)$$

where

"L" corresponds to the aggregation level;

"$Y_{p,k}$" is a value generated based on the C-RNTI or SPSC-RNTI as will be described below. Here, "p" refers to the EPDCCH-PRB set index starting with p=0, where LTE Release 11 supports up to two different EPDCCH-PRB sets (i.e. it supports p=0 and p=1), while "k" refers to a subframe index within a radio frame in the range 0-9, or to value k=(−1) as an initialization value, as outlined below;

"$N_{ECCE,p,k}$" corresponds to the total number of ECCE(s) in the EPDCCH-PRB set p in subframe k;

"m" is a value comprised between 0 and M−1 and identifies the m-th EPDCCH candidate;

"M" corresponds to the number of EPDCCH candidates to monitor at aggregation level L in EPDCCH-PRB-set p;

"b" defines the carrier index if the UE is configured with a carrier indicator field for the serving cell on which EPDCCH is monitored; in other cases b=0; and "i" corresponds to an enhanced control channel element index used for aggregation level L and is between 0 and L−1.

Here in particular, the dependency of the ECCE(s) index from the C-RNTI is given by the value "$Y_{p,k}$". In fact, this value is obtained by an algorithm starting from on an initial value $Y_{p,-1}$. 3GPP TS 36.213 v11.3.0 specifies the following method:

The variable $Y_{p,k}$ is defined by $$Y_{p,k} = (A_p \cdot Y_{p,k-1}) \bmod D$$

where $Y_{p,-1} = n_{RNTI} \neq 0$;

$A_0 = 39827$;

$A_1 = 39829$;

$D = 65537$; and $k = \lfloor n_s/2 \rfloor$, with $n_s$ as the slot number within a radio frame in the range 0-19. In the current implementation, the value $Y_{p,-1}$ is equal to the C-RNTI or SPS C-RNTI, thus resulting in the ECCE(s) index for each UE to be determined based on the C-RNTI or SPS C-RNTI specific to the single UE. Additionally, the C-RNTI and SPS C-RNTI are further used for verification of the successfully blind decoded EPDCCH (s) by means of a CRC check using the C-RNTI or SPS C-RNTI as a mask.

Thus, as can be seen above, the indices of the ECCE(s) forming an EPDCCH candidate for which blind decoding is performed by each UE are determined based on the C-RNTI or SPS C-RNTI. That is, since the C-RNTI and the SPS C-RNTI differ for each user equipment, different UEs will attempt to blind decode different EPDCCH (s). In turn, this means that a single eNodeB wanting to communicate the same data to a plurality of UEs must send this value over a plurality of different EPDCCHs and therefore different ECCEs to the different UEs. As described above, this results in a transmission overhead which cannot be accepted if the data to be transmitted is too frequent, and is the same for a plurality of UEs.

The present invention solves the above mentioned problem by defining a new RNTI field, which in the following will be referred to as a configurable RNTI, and using the configurable RNTI instead of the C-RNTI when determining the EPDCCH (s) for blind decoding. In this manner, the UE will check the PRB for EPDCCH candidates based on the value of the new configurable RNTI. In other words, the indices of the ECCE forming EPDCCH candidates for blind decoding will be selected based on the configurable RNTI value.

The bit dimensions of the new configurable RNTI can be similar to those of the C-RNTI. However, while the C-RNTI is specific for each UE, the new configurable RNTI can be set as the same value for more than one UE in the same cell. In some cases, the value of the configurable RNTI could be set to the same value for up to all the UEs in the cell. In any case, the decision on how many UEs should be given the same value for the new configurable RNTI is left to the eNodeB (eNB).

In particular, with reference to the formula (1) above, the value $Y_{p,-1}$ corresponds to the new configurable RNTI. In this manner, the indexes for the ECCE(s) and therefore the EPDCCH candidate(s) of the UE will be based on the new configurable RNTI. It follows that two UEs having the same value for the new configurable RNTI will also attempt blind decoding of the same ECCE(s) and EPDCCH candidate(s).

Figure 7:
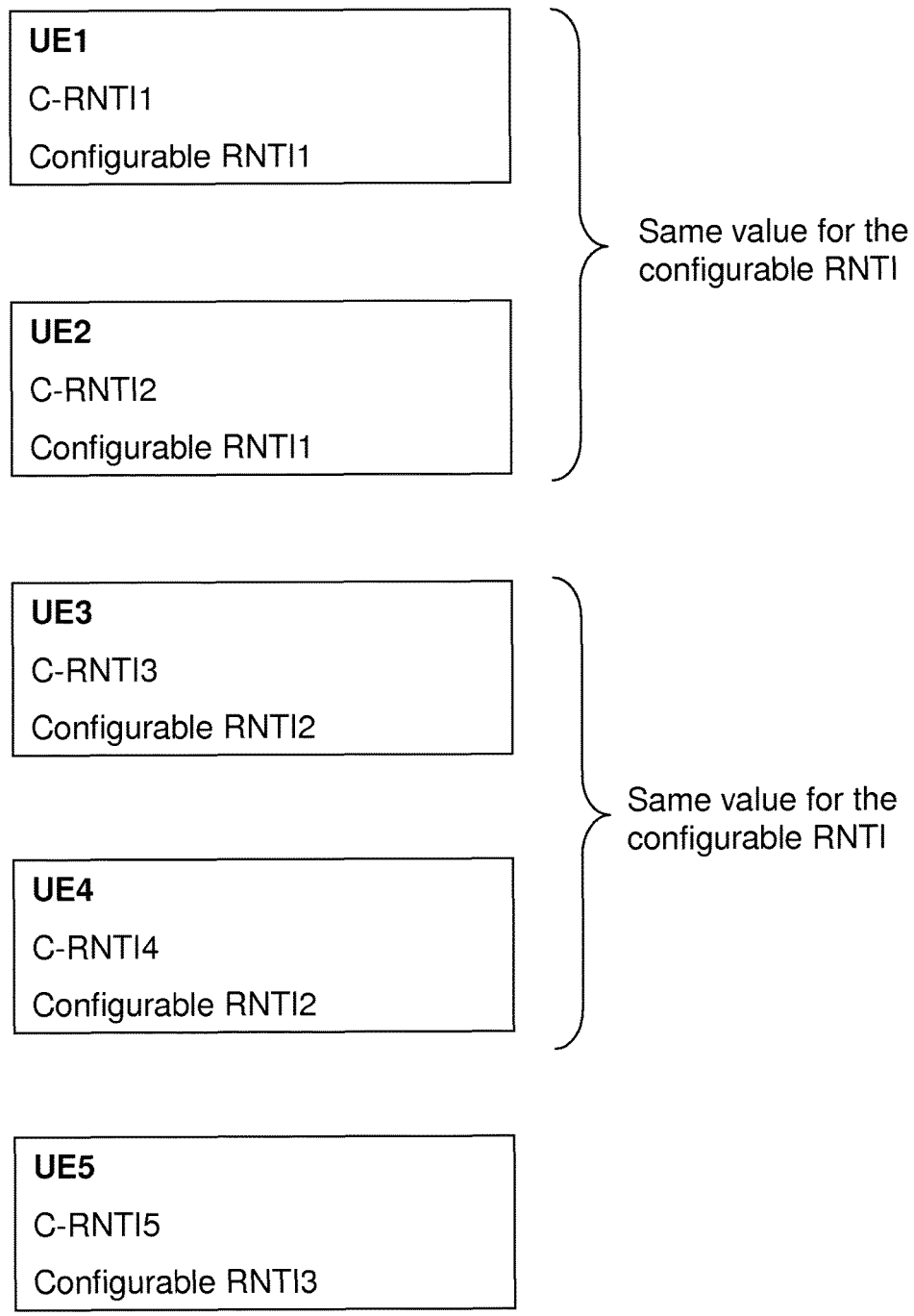

Once the EPDCCH candidates have been successfully decoded, the CRC checking can be run based on the value of the new configurable RNTI as well as based on the value of the C-RNTI. In this manner, two kinds of DCI data can be transmitted via the same ECCE(s). This will be described with reference to FIG. 7. In particular, with reference to FIG. 7, five different UEs (UE1 to UE5) are schematically illustrated:

UE1 has a RNTI value equal to RNTI1 and a value for the new configurable RNTI equal to configurable RNTI1;
UE2 has a RNTI value equal to RNTI2 and a value for the new configurable RNTI equal to configurable RNTI1;
UE3 has a RNTI value equal to RNTI3 and a value for the new configurable RNTI equal to configurable RNTI2;
UE4 has a RNTI value equal to RNTI4 and a value for the new configurable RNTI equal to configurable RNTI2;
UE5 has a RNTI value equal to RNTI5 and a value for the new configurable RNTI equal to configurable RNTI3;

If an EPDCCH is intended for a single UE, such as UE1 it can be masked by using the C-RNTI1 in the CRC computation before sending it. In this manner, both UE1 and UE2 will attempt to blind decode the same ECCE(s), as the decision on the ECCE(s) index will be done based on the configurable RNTI value, which is the same value of configurable RNTI1 for both UE1 and UE2. However, UE2 will discard the message since the CRC check against configurable RNTI1, as well as against C-RNTI2 will not prove to be correct. Similarly, UE1 will determine that the CRC check against the configurable RNTI1 does not result in a correct outcome. However, the CRC check against C-RNTI1 will prove to be correct. Thus, UE2 only will successfully decode the content of the EPDCCH.

Conversely, if a EPDCCH is intended for more than a single UE, such as UE1 and UE2, it can be masked by using the configurable C-RNTI1 in the CRC computation before sending it. In this manner, both UE1 and UE2 will attempt to blind decode the same ECCE(s), as the decision on the ECCE(s) index will be done based on the configurable RNTI value, which is the same value of configurable RNTI1 for both UE1 and UE2. Thereafter, both UE2 and UE1 will determine that the CRC check against the configurable RNTI1 results in a correct outcome. Thus, the single ECCE will reach both the UE1 and UE2, without the need for sending the same message twice, independently, to UE1 and UE2.

The approach of the present invention is further advantageous as it does not involve a noticeable additional effort for the UEs since only one additional CRC operation is to be carried out. This is in contrast to the option of determining, twice, different ECCE(s) based on the new configurable RNTI and on the C-RNTI and carrying out the corresponding blind decoding which implies the presence of extra Viterbi operations, which requires much more computational effort.

Although above it has been described that the CRC check at the UE is first carried out with respect to the value of the new configurable RNTI and then with respect to the C-RNTI, the present invention is not limited thereto. Alternatively, the opposite approach could be carried out, in which the UE first runs a CRC check against the C-RNTI value and then against the new configurable RNTI value, or where the checks are implemented in a parallel fashion. Those skilled in the art will appreciate that this is an implementational matter which has no effect on the present invention.

While one possible use of the new configurable RNTI has been described above, in the following it will be explained how the new configurable RNTI can be generated and/or transmitted.

The new configurable RNTI can be set to a different value for each EPDCCH-RPB set, or can be set to the same value for both currently available sets. In any case, the configurable RNTI can be set to any value based on the following mechanisms:

the configurable RNTI can be set to a fixed value, for instance to a value equal to 0. In this manner, the UE does not need to compute any value for the new configurable RNTI, nor any value needs to be transmitted from the eNB;

the configurable RNTI can be set based on a parameter associated with the cell detection procedure, such as the Physical Cell Identifier (in the following, PCID) which is part of the synchronization mechanism. For instance, the new configurable RNTI could be set to a value or PCID+1, so as to avoid the value of 0. Still alternatively, any function that can generate an output value based on the PCID as input, or more generally, based on any parameter associated with the cell detection procedure, can be used instead.

In the cases above, the new configurable RNTI does not need to be transmitted from the eNB to the UE, since its value is either fixed, or can be computed by the UE based on other parameters. Conversely, in those cases where the UE needs to receive the new configurable RNTI, either directly or calculating it indirectly based on the value of a received stream, the transmission thereof could be done, for instance, in any of the following manner:

the configurable RNTI can be derived from the Master Information Block (in the following, MIB); and/or equivalently from the Physical Broadcast Channel (in the following, PBCH). Benefit: By using the MIB or the PBCH, even idle mode UEs are allowed to read the value of the new configurable RNTI and therefore access the corresponding search space, for instance for acquiring SI messages. According to section 5.2.1.1 of 36.331: "The MIB includes a limited number of most essential and most frequently transmitted parameters that are needed to acquire other information from the cell, and is transmitted on BCH." In 36.212 section 4.2 Table 4.2-1 is it specified that the BCH is transmitted on the PBCH. Thus, both the MIB and PBCH can be used for calculating the value for the new configurable RNTI at the UE. Still alternatively, the configurable RNTI can be derived from a Radio Resource Control (in the following, RRC) message. The advantage of using the RRC approach is that it already is used for sending several parameters to the UE. Thus, the new configurable RNTI could form part of the payload of the RRC signaling, or it could be computed at the UE based on the value of the RRC message.

For instance, in case of using the MIB or PBCH, one or more bits can be used to indicate a value that is used to derive the new configurable RNTI. For example if three bits are used in such a manner in the MIB, these three bits could be interpreted as the LSB (or alternatively MSB) of the new configurable RNTI, where the remaining bits would be assumed to be a predetermined value such as 0.

Still alternatively, the value of the new configurable RNTI could be computed by the UE based on the value of the MIB and/or of the PBCH and/or of the RRC information element. That is, any function that has as input any combination of those parameters and that can output a value comparable with the length of the configurable RNTI could be used. For instance, the value indicated by the at least one bit in the MIB/PBCH or in an RRC information element would be usable by lookup or formula to choose or generate different new configurable RNTI values. For example, if two bits are used in such a fashion, a relation like in the following table can be used to obtain the new configurable RNTI.

| Value of the two bits indicated by MIB or RRC (binary representation) | Value for the new configurable RNTI (hexadecimal representation) |
|---|---|
| 00 | 0000 |
| 01 | FFF4 |
| 10 | FFF5 |
| 11 | FFF6 |

While the above numbers may seem to be just a design choice, choosing one out of the values 0000, FFF4-FFFC are preferred as none of those are currently employed for use, as outlined in the RNTI table in the introduction part. Therefore the usage of one or more of those cannot cause any confusion to implementations that follow earlier Releases of the 3GPP specifications.

In the following, additional examples will be given concerning the use of the new configurable RNTI in the EPD-CCH search space. It will be clear to those skilled in the art that those examples can be combined together or implemented independently from each other.

In some embodiments, the use of the new configurable RNTI can be restricted in the time domain. That is, a UE can be configured by a subframe pattern, in which it can monitor the PDCCH UE Specific Search Space (in the following, USS); monitor the EPDCCH with Release 11 behaviour (the Release 11 can be found at http://www.3gpp.org/Release-11 and is herewith enclosed by reference), that is, by setting the value of $Y_{p,-1}$ equal to the value of C-RNTI; and/or monitor the EPDCCH with the new behaviour described above.

In other words the C-RNTI could be used in some subframes for defining the EPDCCH search space, while the new configurable RNTI could be used in other subframes in order to define the EPDCCH search space. An example for such configuration will be given below with the specific case of the TDD reconfiguration.

This provides the benefits that it allows efficient usage even in case that just a single EPDCCH-PRB-set is configured. Additionally, it allows further alignment, for instance with certain existing subframe patterns, such as ABS or CSI measurement patterns. In fact, if a common EPDCCH transmission should be received by many UEs, it should be protected, for instance, against interference. In order to estimate interference correctly, it is desirable that the general interference characteristics do not fluctuate strongly across subframes. However it can be beneficial to operate the system such that an interfering cell is not transmitting in even-numbered subframes, such that an adjacent cell experiences a lower interference level in those subframes than in the odd-numbered subframes. In order to be able to distinguish this in the interference measurement/estimation at the UE, the UE would be configured with a first CSI measurement pattern for the even-numbered subframes and a second CSI measurement set for the odd-numbered subframes. Evidently a more reliable transmission is possible in subframes with reduced interference, i.e. the even-numbered subframes in this example. Therefore it can be beneficial to restrict the detection of EPDCCH employing the new configurable RNTI to subframes that correspond to such a CSI measurement set. In this way, the new configurable RNTI is not employed in other subframes, which reduces the false detection probability and the blocking probability of different control channel transmissions for those other subframes. On the other hand, in the subframes where the new configurable RNTI is employed for the search space determination, preferably used for control channel transmissions targeting multiple UE with the same transmission, the reliability is generally improved due to the lower interference.

In the specific case where the new configurable RNTI is used in order to transmit to several UEs a value for the TDD reconfiguration, DownLink (in the following, DL) subframes can be categorised as Fixed DL subframes and Flexible DL subframes. Here, the Fixed DL subframes are subframes which are D/S for all radio frames regardless of the UL/DL configuration that is being operated. Namely, subframes #0, #1, #5, #6 are fixed DL subframes. Even more specifically, subframes #0, and #5 are fixed DL subframes, while #1 and #6 are defined as special DL subframes. The specifics of a special subframe are outlined e.g. in 3GPP TS 36.211 v11.3.0 section 4.2, which is herewith enclosed by reference. The remaining subframes can be used both in DownLink mode and in UpLink mode, depending on the TDD configuration.

For a common DCI detection without risk of missing the DCI due to TDD reconfiguration, the new configurable RNTI can be used in fixed DL subframes only. That is, in subframes #0, #1, #5, #6 or, even more preferably, subframes #0 and #5. In this manner, it can be ensured that the DCI transmitting the new TDD reconfiguration value will be received by all UEs having the same value for the new reconfigurable RNTI. At the same time, the C-RNTI can be used in flexible DL subframes and/or special subframes, for instance in any of subframes #1, #2, #3, #4, #6, #7, #8 and #9.

In case of applying the new configurable RNTI in an FDD case, it may be preferable to apply the new configurable RNTI for the search space determination in subframes where interference from neighbouring cells can be minimised. One such mechanism employs so-called MBSFN subframes, which can be configured for subframes #1, #2, #3, #6, #7, #8 of a radio frame in the FDD case. It may therefore be preferable to apply the new configurable RNTI for the search space determination only in one or more of those subframes, or even to limit the possibility of using the configurable RNTI in those subframes in case that e.g. an RRC configuration pattern determines the subframes where the new configurable RNTI can be applied.

In this manner, the decoding effort required at the UE is not increased, since only one EPDCCH search space is defined for each subframe. Nevertheless, by defining the search space based on the new configurable RNTI in some subframes, while using the C-RNTI in the remaining subframes, it is possible to efficiently send a DCI message to a plurality of UEs in those subframes where the new configurable RNTI is used, while it is still possible to have different EPDCCH search spaces for different UEs when the C-RNTI is used. In this case, while the CRC check can be run based on both the C-RNTI and the new configurable RNTI, as described above, for the subframes in which the search space is defined by the new configurable RNTI, it is also possible to perform only a CRC check based on the new configurable RNTI for those subframes, so as to reduce the computation effort required at the UE by avoiding the additional CRC check based on the C-RNTI.

The decision on which subframes employ a EPDCCH search space based on the new configurable RNTI and which subframes employ a EPDCCH search space based on the C-RNTI can be fixed or can change in time, where the changes can be communicated to the UEs as part of the DCI, or together with the new configurable RNTI value, in the manners described above for transmitting the new configurable RNTI value to the UEs.

In some embodiments, the use of the new configurable RNTI can be restricted to specific aggregation levels. In particular, two cases can be defined depending on whether broad coverage is requested or whether optimized coverage for those UEs with a better radio conditions is requested. In this way, part of the search space is determined by the new configurable RNTI while another part of the search space is determined by a different RNTI (such as the C-RNTI).

In the first case, namely when having broad coverage of the UEs is the intended goal, the new configurable RNTI can be used to determine ECCE(s) indices only for EPDCCH candidates of high aggregation levels. In general, aggregation levels 1, 2, 4, 8, 16, 32 are supported in LTE Release 11. High aggregation levels in this context could be e.g. aggregation levels 8, 16, 32, or aggregation levels 16 and 32, or at least aggregation level 32 while low aggregation levels could be e.g. aggregation levels 1, 2, 4 or aggregation levels 1 and 2, or at least aggregation level 1. However, for a given EPDCCH-PRB-set not necessarily all those aggregation levels are supported. In particular in such cases, aggregation levels higher than the two lowest aggregation levels that are applicable for an EPDCCH-PRB-set, or more specifically used only for the one or two highest aggregation levels that are applicable for an EPDCCH-PRB-set. For example, Table 9.1.4-1 a defines for so-called Case 1 and two PRB in the EPDCCH-PRB-set that aggregation levels 2, 4, 8 are applicable with a number of blind decoding of at least 1. Consequently, according to this embodiment the new configurable RNTI would only be applicable to the blind decoding attempts of aggregation level 8, or alternatively of aggregation levels 4 and 8. For the remaining aggregation level blind decoding attempts, the control channel elements would be preferably determined according to the UE's C-RNTI. This reduces the collision/blocking probability for low aggregation dedicated DCI transmissions in the EPDCCH-PRB-set. That is, by using the C-RNTI in the lower aggregation level instead of using the new configurable RNTI, the search space for those lower aggregation level can be more diversified, which results in a lower collision/blocking probability.

In the case of two distributed EPDCCH-PRB-sets, if the first set offers more high aggregation level candidates than the second set, then the new configurable RNTI could be used in the first set only, so as to use it only with the higher aggregation levels of the first set. Similarly, in the case of a localized EPDCCH-PRB-set and a distributed EPDCCH-PRB-set, the use of the new configurable RNTI can be applied only to the distributed set.

In the second case, namely when having an optimised common RNTI coverage to UEs in good radio conditions is the goal, the new configurable RNTI can be used to determine ECCE(s) indices only for EPDCCH candidates of lower aggregation levels. In particular, aggregation levels lower than the two highest aggregation levels that are applicable for an EPDCCH-PRB-set, or more specifically used only for the one or two lowest aggregation levels that are applicable for an EPDCCH-PRB-set. For example, Table 9.1.4-1 a defines for so-called Case 1 and two PRB in the EPDCCH-PRB-set that aggregation levels 2, 4, 8 are applicable with a number of blind decoding of at least 1. Consequently, according to this embodiment the new configurable RNTI would only be applicable to the blind decoding attempts of aggregation level 2, or alternatively of aggregation levels 2 and 4. For the remaining aggregation level blind decoding attempts, the control channel elements would be preferably determined according to the UE's C-RNTI. This can be useful, for instance, in the case of small cells, where the quality of the radio connection to the UEs is generally good.

By using the new configurable RNTI for lower aggregation levels, the collision/blocking probability for high aggregation dedicated DCI transmissions in the EPDCCH-PRB-set is reduced. In case of two distributed EPDCCH-PRB-sets, the new configurable RNTI can be used only for the second set, offering more lower aggregation level candidates than the first set. Similarly, In case of a localized EPDCCH-PRB-set and a distributed EPDCCH-PRB-set, the use of the new configurable RNTI can be applied only to the localized set.

In some embodiments, the PRB set for the configurable RNTI could be one or both existing EPDCCH-PRB-sets, or it could be a new third set. In the latter case, the blind decoding attempts for the third set can replace the blind decoding attempts that would be used for PDCCH CSS, which has a current total number of 12 blind decodes. Thanks to this approach, it would be possible to avoid any further blind decoding operation at the UE.

Thus the present invention provides a new field, the new configurable RNTI, which can be used in order to transmit one parameter to more than one UE in the same cell, in an efficient manner, by using the new configurable RNTI in order to define the EPDCCH search space and using the same value for the new configurable RNTI for more than one UE. In this manner, the search space for the UEs having the same value for the new configurable RNTI is the same, and a single message can reach all UEs with the same value of the new configurable RNTI. This increases the efficiency of the transmission of the message, such as a DCI message, to multiple UEs. One possible parameter which could benefit from such a transmission scheme is the value of the TDD, although the present invention is not limited thereto. Moreover, the new configurable RNTI is not necessarily always used for defining the EPDCCH search space, but can be limited in time or in aggregation levels, so as to provide a common EPDCCH search space only in some cases. Further, even when the new configurable RNTI is used for defining a EPDCCH search space common to more than one UEs, each single UE can still receive a unicast message, which is not directed to the other UEs, simply by checking the CRC value of the received message against both the new configurable RNTI, common to more than one UEs, and the C-RNTI, specific for each single UE. In this manner, while the number of blind decoding is not increased, unicast and broadcast messages are possible at the same time, on the same search space.

The present invention therefore allows the creation of a common EPDCCH search space for efficient transmission of parameters common to a plurality of UEs with minor modifications of the transmission architecture and with a limited increase in computation requirement at the UE.

The invention claimed is:

1. A methods of determining resources for control channel transmission, comprising:
   storing a configurable Radio Network Temporary Identifier in a first User Equipment and in a second User Equipment in the same cell of the first User Equipment,
      wherein the configurable Radio Network Temporary Identifier has the same value for the first User Equipment and for the second User Equipment, and
      wherein the configurable Radio Network Temporary Identifier is configured to define a common search space in an Enhanced Physical Downlink Control Channel for the first User Equipment and for the second User Equipment; and
   transmitting control data to at least one of the first User Equipment and the second User Equipment,
      wherein the control data is mapped to one or more Enhanced Control Channel Elements,
      wherein the configurable Radio Network Temporary Identifier is used to map the control data to two lowest available aggregation levels of the one or more Enhanced Control Channel Elements, and
      wherein the configurable Radio Network Temporary Identifier is not used to map the control data to at least one of the remaining aggregation level(s) of the one or more Enhanced Control Channel Elements.

2. The method according to claim 1, wherein the value of the configurable Radio Network Temporary Identifier is:
   a fixed value of 0,
   a second value computed based on a Physical Cell ID of the cell,
   a third value computed based on a value conveyed by a Master Information Block (MIB),
   a fourth value computed based on a value of a Physical Broadcast Channel, or
   a fifth value computed based on a value of a Radio Resource Control information element.

3. The method according to claim 2, wherein the value of the configurable Radio Network Temporary Identifier is equal to the Physical Cell ID plus 1.

4. The method according to claim 1, wherein the step of transmitting control data comprises adding a Cyclic Redundancy Check code to the control data, wherein the Cyclic Redundancy Check code is masked by performing a binary XOR operation of the Cyclic Redundancy Check code with the configurable Radio Network Temporary Identifier.

5. The method according to claim 1, wherein the step of transmitting control data comprises adding a Cyclic Redundancy Check code to the control data, wherein the Cyclic Redundancy Check code is masked by performing a binary XOR operation of the Cyclic Redundancy Check code with a Cell Radio Network Temporary Identifier.

6. The method according to claim 1, wherein the configurable Radio Network Temporary Identifier is used to map the control data to two highest available aggregation levels of the one or more Enhanced Control Elements, and wherein the configurable Radio Network Temporary Identifier is not used to map the control data to at least one of the remaining aggregation level(s).

7. The method according to claim 6,
   wherein two distributed Enhanced Physical Downlink Control Channel-Physical Resource Block sets are used and the first set of the two Enhanced Physical Downlink Control Channel-Physical Resource Block sets offers more high aggregation level candidates than the second set of the two distributed Enhanced Physical Downlink Control Channel-Physical Resource Block sets, and
   wherein the configurable Radio Network Temporary Identifier is used to map the control data in only the first set of the two distributed Enhanced Physical Downlink Control Channel-Physical Resource Block sets.

8. The method according to claim 1,
   wherein one distributed Enhanced Physical Downlink Control Channel-Physical Resource Block set and one localized Enhanced Physical Downlink Control Channel-Physical Resource Block set are used, and
   wherein the configurable Radio Network Temporary Identifier is used to map the control data in only the distributed Enhanced Physical Downlink Control Channel-Physical Resource Block set.

9. The method according to claim 1,
   wherein two distributed Enhanced Physical Downlink Control Channel-Physical Resource Block sets are used and the second set of the two Enhanced Physical Downlink Control Channel-Physical Resource Block sets offers more low aggregation level candidates than the first set of the two distributed Enhanced Physical Downlink Control Channel-Physical Resource Block sets, and
   wherein the configurable Radio Network Temporary Identifier is used to map the control data in only the second set of the distributed two Enhanced Physical Downlink Control Channel-Physical Resource Block sets.

10. The method according to claim 1, wherein one distributed Enhanced Physical Downlink Control Channel-Physical Resource Block set and one localized Enhanced Physical Downlink Control Channel-Physical Resource Block set are used, and wherein the configurable Radio Network Temporary Identifier is used to map the control data in only the localized Enhanced Physical Downlink Control Channel-Physical Resource Block set.

11. The method according to claim 1, wherein the control data defines a Time Division Duplex uplink/downlink configuration value for at least one of the first User Equipment and the second User Equipment.

12. The method according to claim 1, wherein the control data is transmitted in fixed downlink subframes including at least subframe 0 and subframe 5 of a radio frame.

13. The method according to claim 12, wherein a Cell Radio Network Temporary Identifier is used to map the control data to the one or more Enhanced Control Channel Elements in the remaining subframes of a radio frame.

14. The method according to claim 1, wherein three Enhanced Physical Downlink Control Channel-Physical Resource Block sets are available and the configurable Radio Network Temporary Identifier is used to map the control data in only one of the three Enhanced Physical Downlink Control Channel-Physical Resource Block sets.

15. A base station comprising:
   a controller configured to store a configurable Radio Network Temporary Identifier in a first User Equipment and in a second User Equipment in the same cell of the first User Equipment,
      wherein the configurable Radio Network Temporary Identifier has the same value for the first User Equipment and for the second User Equipment, and
      wherein the configurable Radio Network Temporary Identifier is configured to define a common search space in an Enhanced Physical Downlink Control Channel for the first User Equipment and for the second User Equipment; and
   a transmitter configured to transmit control data to at least one of the first User Equipment and the second User Equipment,
      wherein the control data is mapped to one or more Enhanced Control Channel Elements,
      wherein the configurable Radio Network Temporary Identifier is used to map the control data to two lowest available aggregation levels of the one or more Enhanced Control Channel Elements, and
      wherein the configurable Radio Network Temporary Identifier is not used to map the control data to at least one of the remaining aggregation level(s) of the one or more Enhanced Control Channel Elements.

16. The base station according to claim 15, wherein a Cyclic Redundancy Check code is added to the control data, wherein the Cyclic Redundancy Check code is masked by performing a binary XOR operation of the Cyclic Redundancy Check code with the configurable Radio Network Temporary Identifier.

17. The base station according to claim 15, wherein a Cyclic Redundancy Check code is added to the control data, wherein the Cyclic Redundancy Check code is masked by performing a binary XOR operation of the Cyclic Redundancy Check code with a Cell Radio Network Temporary Identifier.

18. The base station according to claim 15,
   wherein two distributed Enhanced Physical Downlink Control Channel-Physical Resource Block sets are used and the second set of the two Enhanced Physical Downlink Control Channel- Physical Resource Block sets offers more low aggregation level candidates than the first set of the two distributed Enhanced Physical Downlink Control Channel-Physical Resource Block sets, and
   wherein the configurable Radio Network Temporary Identifier is used to map the control data in only the second set of the distributed two Enhanced Physical Downlink Control Channel-Physical Resource Block sets.

19. The base station according to claim 15, wherein the control data defines a Time Division Duplex uplink/downlink configuration value for at least one of the first User Equipment and the second User Equipment.

20. The base station according to claim 15, wherein the control data is transmitted in fixed downlink subframes including at least subframe 0 and subframe 5 of a radio frame.

* * * * *